W. H. HATTEL.
AUTOMOBILE STORAGE JACK.
APPLICATION FILED MAY 1, 1911.

997,497.

Patented July 11, 1911.

Witnesses:
Walter S. Ward
J. Rogers

Inventor,
William H. Hattel

UNITED STATES PATENT OFFICE.

WILLIAM H. HATTEL, OF KALAMAZOO, MICHIGAN.

AUTOMOBILE STORAGE-JACK.

997,497. Specification of Letters Patent. Patented July 11, 1911.

Application filed May 1, 1911. Serial No. 624,429.

*To all whom it may concern:*

Be it known that I, WILLIAM H. HATTEL, a citizen of the United States, residing at the city of Kalamazoo, county of Kalamazoo, and State of Michigan, have invented a new and useful Automobile Storage-Jack, of which the following is a specification.

My invention relates to improvements in automobile storage jacks, in which a vertically reciprocating plunger is operated by means of a cam pivotally secured to a vertically adjustable cross-head for the purpose of raising an automobile off its wheel tires, thus relieving said tires from the weight of the machine when at rest or in storage.

The objects of my invention are, first to provide jacks that are adjustable for different sizes of wheels; second, to provide a jack in which the lever actuating the raising mechanism shall operate parallel to the side of the frame and the wheel, thereby reducing the space occupied by the jack outside of the wheel to a minimum, and in which the weight of the said lever shall lock said raising mechanism in either an up or down position; third, to provide a jack having three bearing points in its base, to insure stability on the floor and prevent liability of tipping over when bearing the weight of the automobile; fourth, to provide a jack that shall be inexpensive to manufacture, effectual in operation and neat in appearance.

Other objects will more definitely appear in the detail description to follow.

I accomplish the objects of my invention by the devices and means described in this specification and definitely pointed out in the claims.

Structures embodying the features of my invention are clearly illustrated in the accompanying sheet of drawings, forming a part of this specification, in which—

Figure 1:
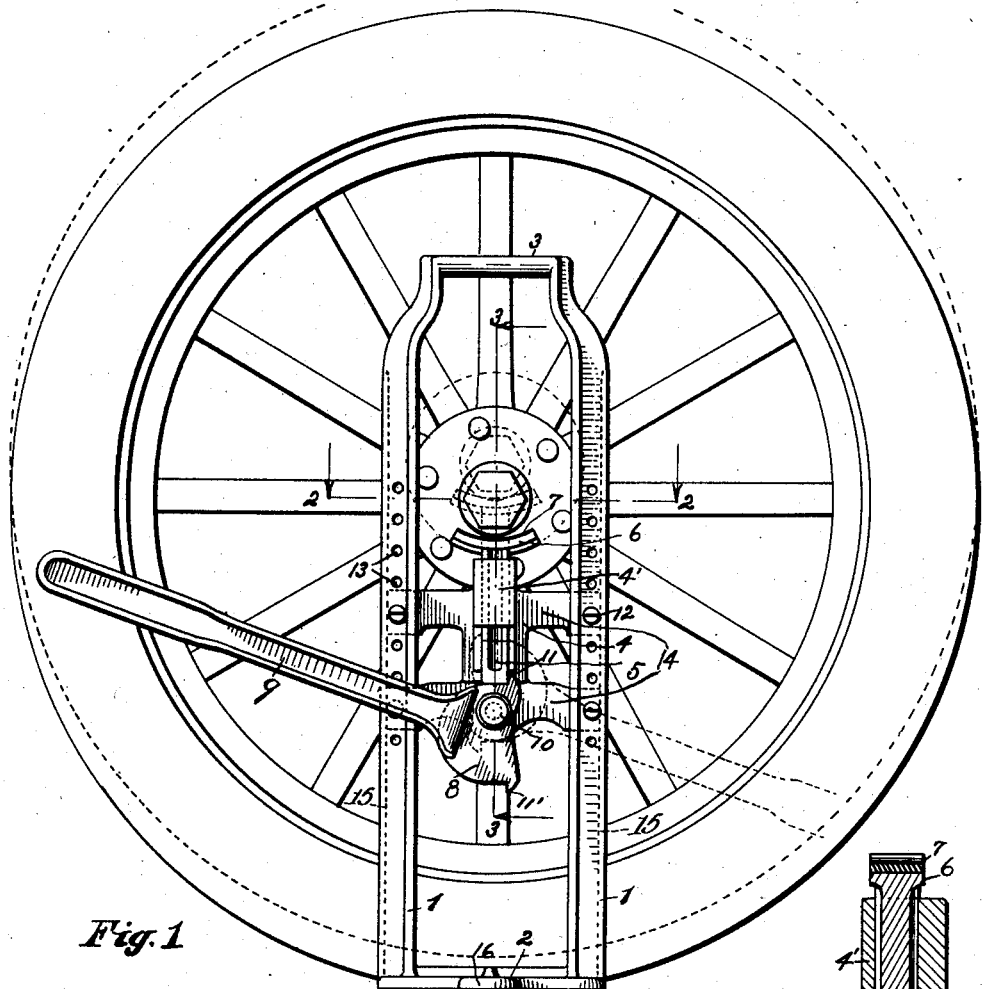
Figure 2:
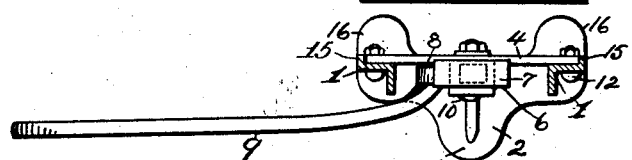
Figure 3:
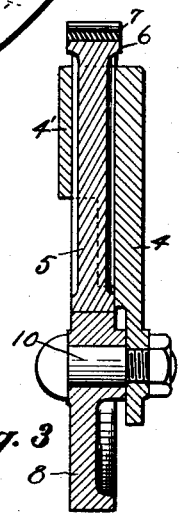

Figure 1 is a side elevation of my improved jack in position for raising one of the wheels of an automobile while on its axle. Fig. 2 is a horizontal cross-section taken on section-line 2 2 of Fig. 1. Fig. 3 is an enlarged detail vertical section taken on the section-line 3 3 of Fig. 1.

In the drawings the sectional views are taken looking in the direction indicated by the little arrows at the ends of the section-lines, and similar reference characters refer to similar parts throughout the several views.

Referring to the separate parts of my jack as illustrated in the drawings, 1 1 are uprights secured to the base portion 2 and the handle portion 3, all of which constitute the frame of my improved jack. The base portion 2 is provided with the three projecting parts 16 16 16, which gives a wide base and insures stability from toppling over when under the weight of the automobile. The uprights 1 1 are of a double angle in cross-section as shown in Fig. 2 and are curved toward each other at the top, and joined to the handle portion 3, which is for the purpose of lifting and carrying said jack. The legs 15 15 of the uprights 1 1 serve as guides for the cross-head 4, as well as to give strength and stiffness to said uprights.

The cross-head 4 is composed of arms 14 extending from either side and are secured to said uprights by means of bolts 12, as shown in Figs. 1 and 2. Holes 13 in the uprights 1 1 allow of vertical adjustment of said cross-head to different sizes of wheels. Cross-head 4 is provided with a sleeve 4', which carries a vertically reciprocating plunger 5, said plunger being provided with the saddle portion 6, upon which the hub of the automobile wheel rests when raised from the floor. Said saddle is provided with a padding 7 to prevent marring the hub.

A cam 8 is rotatably secured to cross-head 4, by means of the shouldered bolt 10 as shown in Fig. 3. Said cam is provided with a suitable operating lever 9, and also with stop members 11 and 11', which are adapted to engage the plunger 5 when said cam is rotated to opposite positions, as shown in Fig. 1. The lever 9 is curved outwardly as shown in Fig. 2, sufficient to pass the end of the wheel hub when said lever is thrown to its opposite position in raising the wheel.

In the operation of my jack, it is placed close up to the side of the wheel, with the saddle 6 under the hub thereof as shown in Fig. 1. The lever 9 is then thrown over to its opposite position as shown in dotted lines. This rotates the cam 8, which raises the plunger 5, thus raising the wheel as indicated in dotted lines in Fig. 1. It will be noted that when the cam has raised the plunger to its extreme limit, that stop 11' engages plunger 5, thus, through the weight of lever 9, it is securely locked in its raised position and will not become released until said lever is reversed.

It will be observed that the vertically reciprocating or lifting plunger of my jack does not have an intermittent or step-by-step movement as provided in ordinary lifting jacks, but is actuated through its entire movement by one operation of the lever and cam, or other suitable mechanism which might be provided for actuating said lifting plunger. This is of great importance, for once the jack is adjusted to the size of wheels of an automobile it is always ready for use, so that all that is necessary to do is to place the jack under the wheel and throw the lever over to its opposite position when it becomes securely locked, without the aid of "detents" or other similar locking devices. It will also be noted that in the construction of my jack, in adapting the lever to be actuated parallel to the side of the wheel that I am able to economize in room in storing automobiles in a garage as they can be placed very close together, which is considered a very important feature by garage men.

I desire to state that while I have shown my improved jack in its most approved form of construction, I am aware that it may be greatly varied in details without departing from the essential features of my invention.

Having thus described my invention, what I claim as new and desire to secure by Letters Patent is.

1. In an automobile storage jack, the combination of a base having three projecting members; double angle uprights projecting therefrom and curved at top to engage a suitable handle; a cross-head having arms adapted to be adjustably secured to said uprights by means of bolts; a vertically reciprocating plunger provided with a saddle, said saddle being provided with a pad to prevent marring the hub, said plunger operating in a sleeve secured to said cross-head; a cam rotatively secured to said cross-head beneath said plunger and adapted to raise said plunger when said cam is rotated; limiting stops secured to said cam and adapted to engage opposite sides of said plunger to limit the movement of said cam and retain it in either its up or down position, and a lever secured to said cam in such a position that its weight locks and holds said cam in either its normal or raised position, substantially as shown and specified.

2. In an automobile storage jack, the combination of a suitable base; suitable uprights secured to said base; a suitable handle secured to the top of said uprights; a suitable cross-head secured to said uprights; a vertically reciprocating plunger having a saddle secured to the upper end thereof, and retained within a suitable sleeve secured to said cross-head; and a rotative cam provided with a lever and limiting stops suitably secured to said cross-head beneath said plunger and adapted to actuate the same, substantially as shown and for the purpose specified.

3. In an automobile storage jack, the combination of a suitable upright frame provided with a base; a suitable handle secured to the upper part of said upright frame; a suitable vertically adjustable cross-head secured to said frame; a vertically reciprocating plunger suitably retained in said cross-head; and a rotative cam provided with a lever and secured to said cross-head and adapted to actuate said plunger for the purpose specified.

4. In an automobile storage jack, the combination of a suitable upright frame provided with a base and lifting handle; a cross-head retained within guides on said upright frame and adjustably secured thereto; a vertically reciprocating plunger suitably retained in said cross-head and means for actuating said plunger, for the purpose specified.

5. In an automobile storage jack, the combination of an upright frame provided with a base and lifting handle; a cross-head guided within said frame and adjustably secured thereto; a lifting-plunger retained in said cross-head; a cam suitably secured to said cross-head and adapted to actuate said lifting plunger through its limit of movement by one movement of said cam, substantially as shown and described.

6. In an automobile storage jack the combination of an upright frame provided with a base and handle; a cross-head adjustably secured to said frame; a lifting-plunger retained in said cross-head and suitable means secured to said cross-head to actuate said lifting-plunger and lock it at either limit of its movement, substantially as shown and described.

7. In an automobile storage jack, the combination of a main frame provided with a base and handle; a cross-head secured to said frame; a lifting-plunger retained in said cross-head and suitable means secured to said cross-head to actuate said plunger, substantially as shown and for the purpose specified.

8. In an automobile storage jack, the combination of a main frame; a cross-head adjustably secured to said frame; a lifting-plunger retained in said cross-head and means secured to said cross-head for actuating said plunger, in which the actuating lever thereof shall operate in a plane parallel to the side of the frame of the jack and wheel, when said jack is in position for raising an automobile wheel, and in which the overhanging weight of said actuating lever shall effectually lock the raising mechanism at either limit of its movement, substantially as shown and described.

In witness whereof, I have hereto set my hand and seal in the presence of two witnesses.

WILLIAM H. HATTEL. [L. S.]

Witnesses:
WALTER S. WOOD,
F. ROGERS.

Copies of this patent may be obtained for five cents each, by addressing the "Commissioner of Patents, Washington, D. C."